(12) United States Patent
Miller et al.

(10) Patent No.: US 10,197,159 B2
(45) Date of Patent: Feb. 5, 2019

(54) MULTI-PIECE CLEVIS FOR A GEAR SHIFT ASSEMBLY

(71) Applicants: ThyssenKrupp Presta AG, Eschen (LI); ThyssenKrupp AG, Essen (DE)

(72) Inventors: Marvin Miller, Westfield, IN (US); Christian Pichonnat, Indianapolis, IN (US)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 524 days.

(21) Appl. No.: 14/864,178

(22) Filed: Sep. 24, 2015

(65) Prior Publication Data

US 2017/0089459 A1    Mar. 30, 2017

(51) Int. Cl.
*F16H 63/08*    (2006.01)

(52) U.S. Cl.
CPC .................................. *F16H 63/08* (2013.01)

(58) Field of Classification Search
CPC ......... Y10T 403/32221; Y10T 74/7014; Y10T 74/20159; Y10T 74/20104; Y10T 74/2011; F16H 2059/026; F16H 59/0278; F16H 59/0286; F16H 2063/3083; F16H 2063/3079; F16H 2063/3076; F16H 61/22; F16H 61/223
See application file for complete search history.

(56) References Cited

U.S. PATENT DOCUMENTS

| | | | |
|---|---|---|---|
| 4,092,773 A | 6/1978 | Donahue | |
| 4,245,521 A * | 1/1981 | Osborn | B60K 20/02 74/473.15 |
| 6,234,038 B1 * | 5/2001 | Loeffler | F16H 63/30 74/473.25 |
| 7,270,623 B2 * | 9/2007 | Wang | B60R 25/02144 477/96 |

* cited by examiner

*Primary Examiner* — Jonathan P Masinick
(74) *Attorney, Agent, or Firm* — The Webb Law Firm

(57) ABSTRACT

A clevis assembly for use in a gear shift assembly of a vehicle, wherein the clevis assembly comprises a clevis bracket having a first end and a second end, the clevis bracket configured to be linked to a gear shift lever at the first end thereof. The clevis assembly further comprises at least one additional member configured to be coupled to the second end of the clevis bracket, wherein the at least one additional member comprises one or more contact surfaces configured to interact with one or more components of the gear shift assembly.

19 Claims, 7 Drawing Sheets

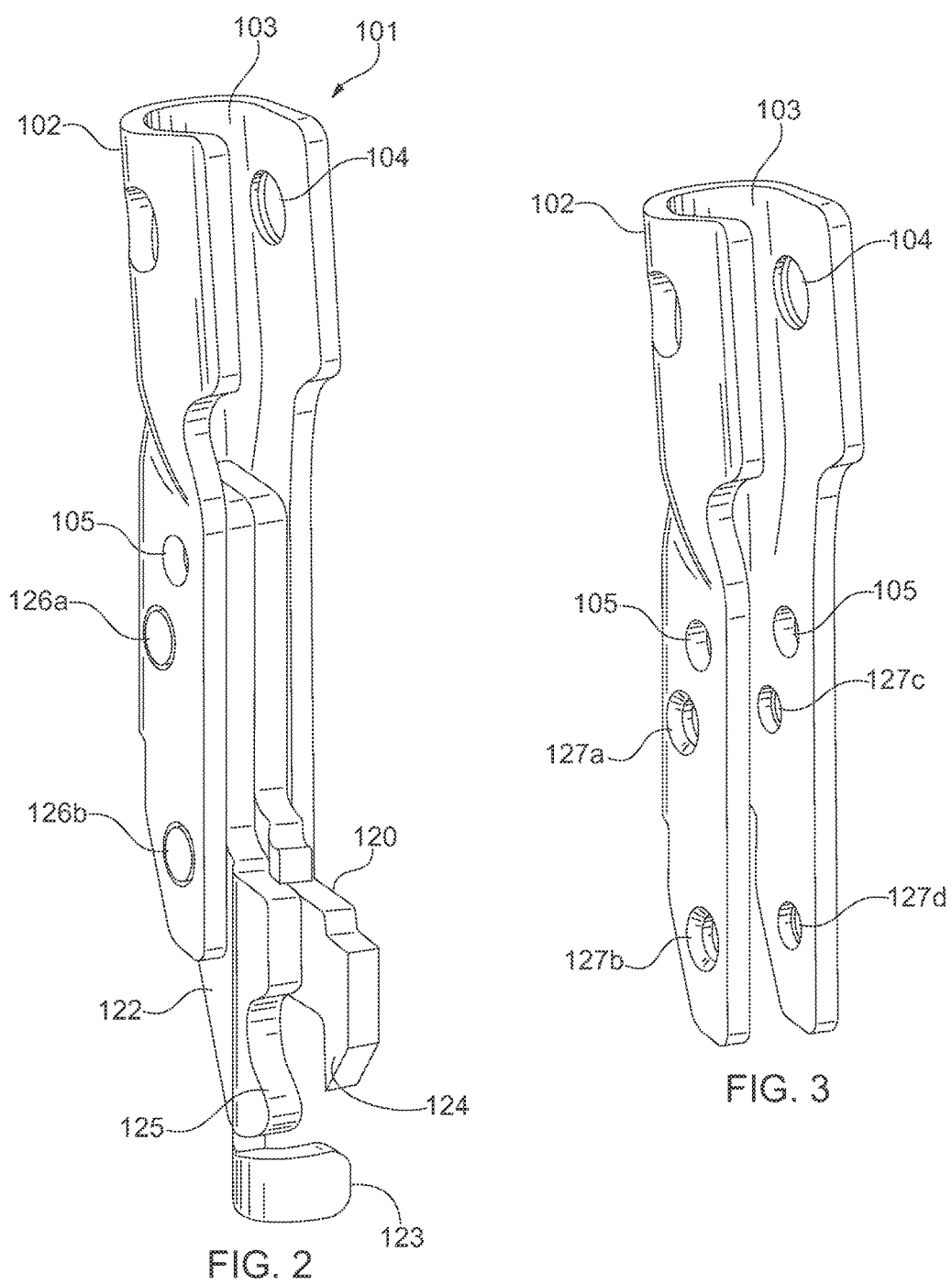

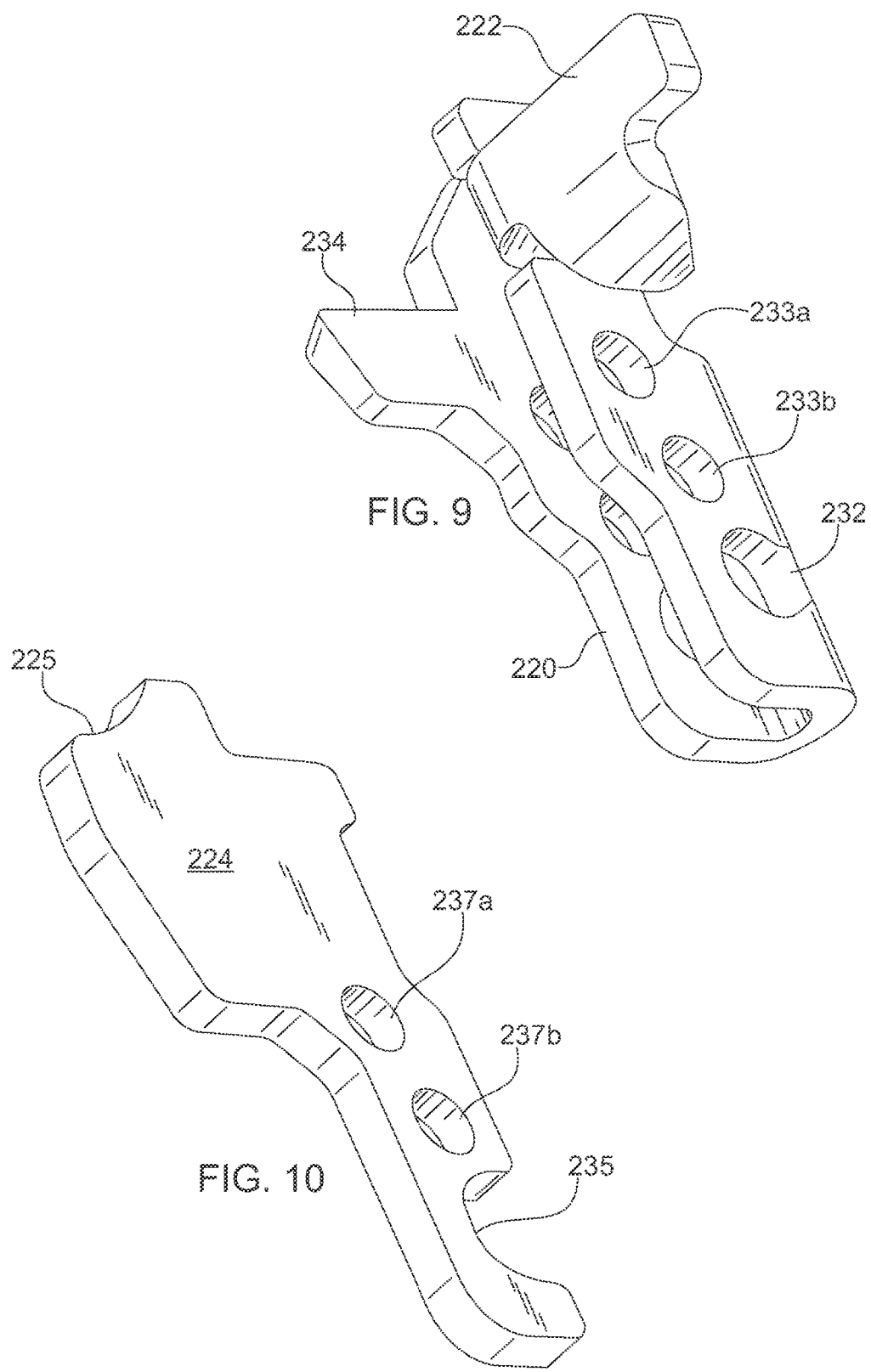

MULTI-PIECE CLEVIS FOR A GEAR SHIFT ASSEMBLY

BACKGROUND OF THE INVENTION

Field of the Invention

The invention relates generally to a gear shift assembly for a vehicle. More specifically, the invention relates to a multi-piece clevis device used in the gear shift assembly.

Description of Related Art

Gear shift assemblies for vehicles and other motorized equipment generally comprise many interrelated components necessary for translating an operator's desired drive setting into actual gear modifications within the transmission. For example, a vehicle having an automatic transmission enables the operator to change the transmission settings between Park, Neutral, Reverse, Drive, etc., through the use of a single gear shift lever located within the vehicle.

One such component of a conventional gear shift assembly is known as a clevis, which acts as a linkage between an operator-interface shift lever and various components within the gear shift assembly that affect the transmission settings. Acting essentially as an extension of a lever, the clevis sees relatively high torque forces when the shift lever is operated. Additionally, various surfaces of the clevis act as contact points with various detents and switches within the gear shaft assembly. These contact points must have sufficient wear strength to avoid substantial degradation, malfunction, and/or damage through repeat usage of the gear shift assembly. It is also important for the clevis to be manufactured to precise tolerances so as to ensure proper engagement and alignment between the clevis surfaces and the detents, switches, and other surfaces within the gear shift assembly.

Conventionally, the clevis is a unitary metallic piece formed via a casting process, e.g., investment casting. Investment casting is utilized due to the high strength requirements, complex shapes, and tight tolerances needed in forming the clevis. However, investment casting is an expensive and time-consuming process, often with a limited supplier base. Unfortunately, other methods of casting or molding do not typically meet the strength, wear, and tolerance requirements desired for forming the clevis.

Accordingly, it is desirable to provide a less costly and more easily manufactured clevis, while still retaining the high strength and complex shapes of a conventional cast clevis for a gear shift assembly.

SUMMARY OF THE INVENTION

Generally, provided is a clevis assembly for use in the gear shift assembly of a vehicle or other motorized equipment. Preferably, provided is a high-strength, multi-piece clevis assembly capable of being manufactured using sheet material as opposed to a casting operation.

According to one preferred and non-limiting aspect, provided is a clevis assembly for use in a gear shift assembly of a vehicle, the clevis assembly comprising a clevis bracket having a first end and a second end, the clevis bracket configured to retain at least one end of a gear shift lever at the first end thereof. The clevis assembly further comprises at least one additional member configured to be coupled to the second end of the clevis bracket, wherein the at least one additional member comprises one or more contact surfaces configured to interact with one or more components of the gear shift assembly.

According to another preferred and non-limiting aspect, provided is a gear shift assembly for a vehicle, the gear shift assembly comprising an armature coupled to a first end of a cable or other linkage, wherein the second end of the cable or other linkage is configured to be coupled to a transmission assembly of the vehicle, and a clevis assembly configured to rotate the armature between a first position and a second position. The clevis assembly comprises a clevis bracket having a first end and a second end, the clevis bracket configured to retain at least one end of a gear shift lever at the first end thereof, and at least one additional member configured to be coupled to the second end of the clevis bracket, wherein the at least one additional member comprises one or more contact surfaces configured to interact with one or more components of the gear shift assembly.

In another preferred and non-limiting aspect, provided is a method of forming a clevis assembly for use in a gear shift assembly of a vehicle, the method comprising the steps of forming a clevis bracket having a first end and a second end, forming at least one additional member having one or more contact surfaces thereon, and coupling the at least one additional member to the second end of the clevis bracket.

These and other features and characteristics of the present invention, as well as the methods of operation and functions of the related elements of structures and the combination of parts and economies of manufacture, will become more apparent upon consideration of the following description and appended claims with reference to the accompanying drawings, all of which form a part of the specification, wherein like reference numerals designate corresponding parts in various figures. It is to be expressly understood, however, that the drawings are for the purpose of illustration and description only and are not intended as a definition of the limits of the invention. As used in the specification and claims, the singular form of "a," "an," and "the" include plural referents unless the context clearly dictates otherwise.

BRIEF DESCRIPTION OF THE DRAWING(S)

FIG. 2 is a perspective view of one aspect of a multi-piece clevis according to the principles of the present invention.

FIG. 3 is a perspective view of one aspect of a clevis bracket according to the principles of the present invention.

FIG. 9 is a perspective view of another aspect of a first clevis plate according to principles of the present invention.

FIG. 10 is a perspective view of another aspect of a second clevis plate according to principles of the present invention.

DESCRIPTION OF THE INVENTION

Figure 1:
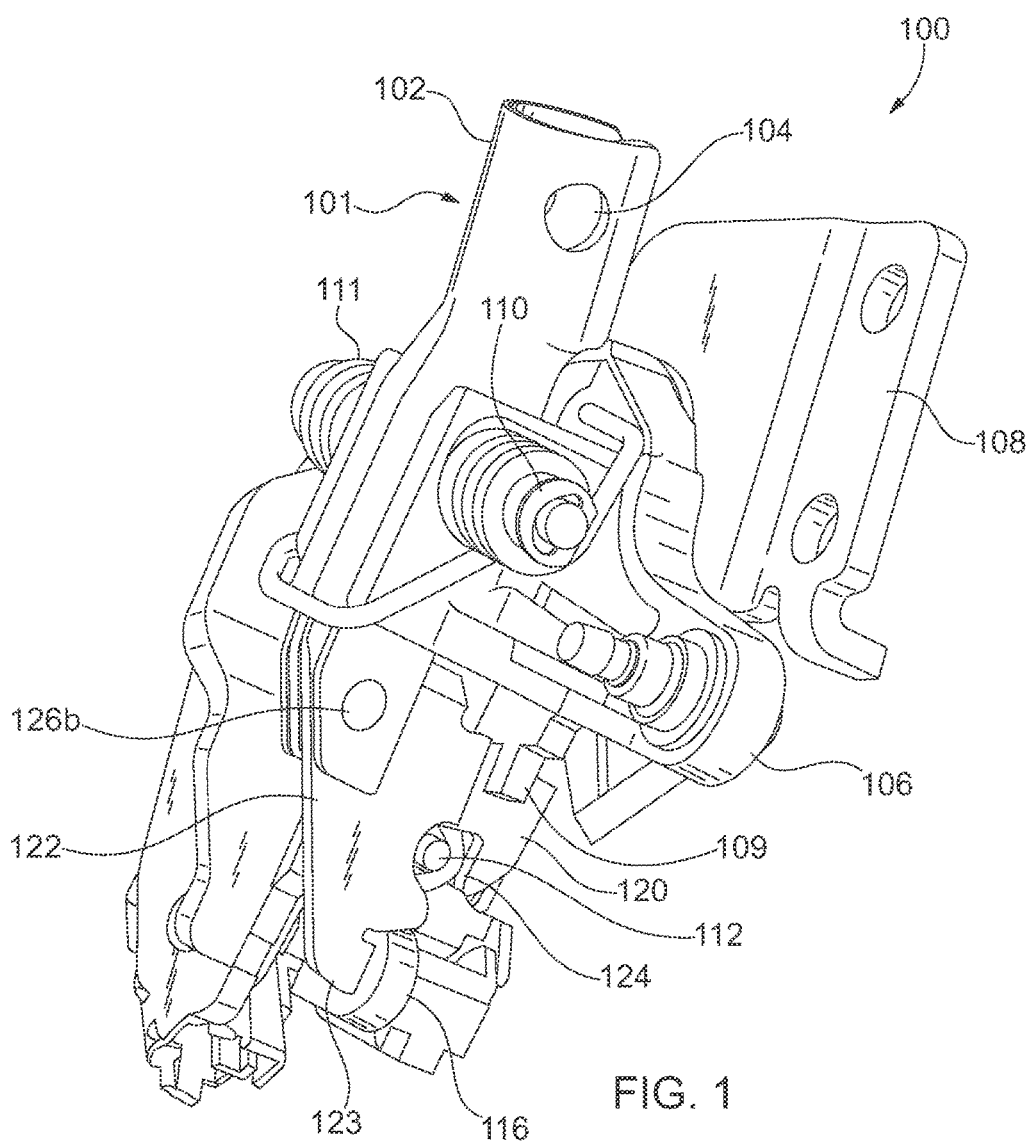
FIG. 1 is a perspective view of one aspect of a gear shift assembly according to the principles of the present invention.

For the purposes of the description hereinafter, the terms "upper," "lower," "right," "left," "vertical," "horizontal," "top," "bottom" and derivatives and equivalents thereof shall relate to the invention as it is oriented in the drawing figures. However, it is to be understood that the invention may assume various alternate variations and step sequences, except where expressly specified to the contrary. It is also to be understood that the specific devices and processes illustrated in the attached drawings, and described in the following specification, are simply exemplary aspects of the invention. Hence, specific dimensions and other physical characteristics related to the aspects disclosed herein are not to be considered as limiting.

Referring to FIG. 1, a gear shift assembly 100 in accordance with an exemplary aspect of the invention is shown. Gear shift assembly 100 includes a clevis assembly 101 comprising a U-shaped clevis bracket 102, a first clevis plate 120 held within U-shaped clevis bracket 102, and a second clevis plate 122 held within U-shaped clevis bracket 102. The details of clevis assembly 101 will be discussed further hereinbelow with respect to FIGS. 2-5. A shift lever (not shown) configured as the user interface for gear shift assembly 100 may be linked directly to U-shaped clevis bracket 102 via an appropriate fastener (e.g., a screw, pin, etc.) at a hole 104. Alternatively, one or more intervening components may be present between clevis bracket 102 and the shift lever such that clevis bracket 102 and the shift lever are linked by these one or more intervening components. As the user pushes or pulls the shift lever, clevis assembly 101 pivots about a pin 110 attached to a rotating armature 106, with a torsion spring 111 acting to bias the clevis assembly 101 in a first direction. Armature 106 is attached to a cable or other linkage (not shown) and rotates based on the position of the shift lever and clevis assembly 101. This rotation changes the length of the cable or other linkage, thereby moving between gears in the transmission.

A mounting bracket 108 is also provided for fixedly mounting the gear shift assembly 100 to the steering column of the vehicle (not shown). Mounting bracket 108 further comprises a plurality of detents 109, wherein detents 109 set the resting position of clevis assembly 101 for each respective shift position. That is, as clevis assembly 101 is rotated through various shift settings, contact surfaces of both a first clevis plate 120 and/or a second clevis plate 122 engage detents 109 to set the resting position of clevis assembly 101. As will be discussed further hereinbelow, first clevis plate 120 and second clevis plate 122 are coupled to U-shaped clevis bracket 102 to form the overall clevis assembly 101. First clevis plate 120 and second clevis plate 122 can have various shapes and contours to create contact surfaces for detents 109, as well as contact surfaces with other components of gear shift assembly 100. For example, contact surface 124 of first clevis plate 120 is configured to engage a pin 112 of a brake transmission shift interlock (BTSI) device (not shown). In accordance with Federal Motor Vehicle Safety Standard (FMVSS) No. 102, the BTSI device comprises a solenoid that axially retracts pin 112 when the both vehicle's ignition device is engaged and the brake pedal is depressed, thereby allowing clevis assembly 101 to pivot freely out of a "Park" position, as pin 112 will not interfere with contact surface 124 of first clevis plate 120. However, if the ignition is not engaged (i.e., the vehicle is powered off) or the brake pedal is not depressed, the pin 112 is extended to a position wherein any pivoting of clevis assembly 101 is prevented, thus ensuring that the vehicle remains in the "Park" position.

In addition to the BTSI device, gear shift assembly 100 may also comprise a Park Detect Switch (PDS) 116 which interacts with a contact surface 123 of second clevis plate 122. PDS 116 is activated when clevis assembly 101 is moved to the "Park" position, at which point contact surface 123 touches PDS 116. In accordance with FMVSS Nos. 101 and 102, PDS 116, when activated, may operate to illuminate a visible "Park" indication within the vehicle, and may also prevent an ignition key from being removed from the vehicle lock cylinder if the clevis assembly 101 is not fully secured in the "Park" position.

As described above, clevis assembly 101 is a multi-piece assembly comprising a U-shaped clevis bracket 102, a first clevis plate 120, and a second clevis plate 122. FIG. 2 illustrates further details of clevis assembly 101. As can be seen in FIG. 2, U-shaped clevis bracket 102 comprises an opening or slot 103 sized to fit the distal end of a shift lever therein, with the shift lever being coupled to the U-shaped clevis bracket 102 via a screw, pin, or other appropriate fastener through holes 104. Alternatively, other methods of coupling the shift lever to U-shaped clevis bracket 102 are also possible, such as a press-fit connection, welding, etc. At the other end of U-shaped clevis bracket 102, first clevis plate 120 and second clevis plate 122 are shown inserted between opposite sides of U-shaped clevis bracket 102 and coupled thereto via rivets 126a, 126b. While rivets 126a, 126b are shown, any appropriate fastener or fastening method (such as welding) may be used. A pivot hole 105 is formed through U-shaped clevis bracket 102 to enable the clevis assembly 101 to be pivotally coupled to the gear shift assembly.

Both first clevis plate 120 and second clevis plate 122 comprise a plurality of contact surfaces for contacting the various detents and other components of the gear shift assembly 100, as described above. For example, first clevis plate 120 may comprise a contact surface 124 positioned and sized specifically to contact a pin 112 of the BTSI device, as described above with respect to FIG. 1. Likewise, second clevis plate 120 may have a contact surface 123 positioned and sized to contact a PDS 116, while a rounded surface 125 is positioned and sized specifically to avoid contact with components of the gear shift assembly 100, such as pin 112. It should be readily apparent that first clevis plate 120 and second clevis plate 122 may have different contacts surfaces and shapes than those shown in FIG. 2. Additionally, although two clevis plates are shown and described, it should be understood that more or fewer clevis plates may be utilized, depending on the gear shift assembly design.

Figure 4:
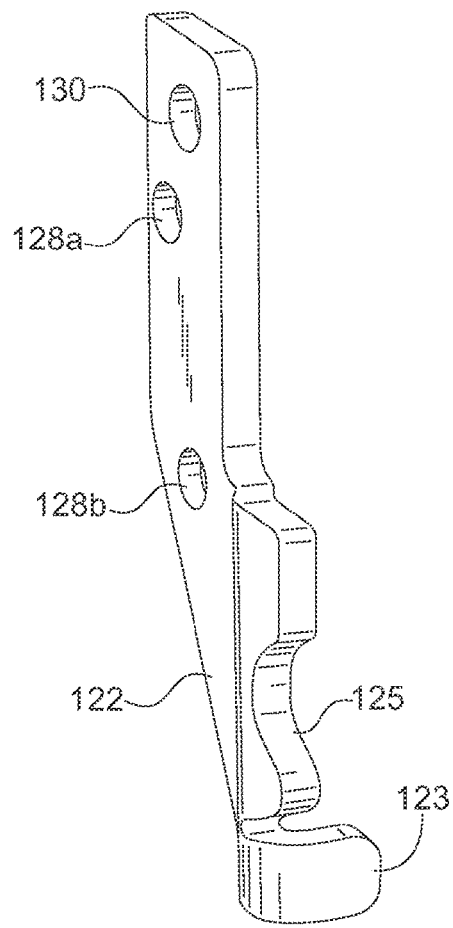
FIG. 4 is a perspective view of one aspect of a first clevis plate according to principles of the present invention.
Figure 5:
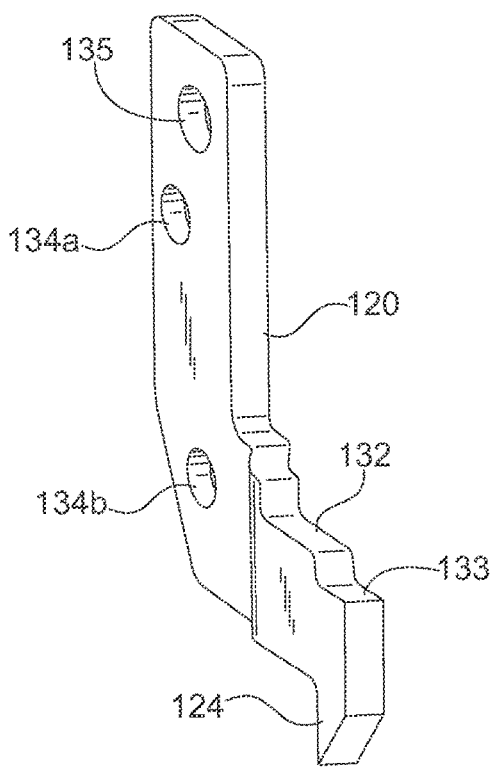
FIG. 5 is a perspective view of one aspect of a second clevis plate according to principles of the present invention.

Referring now to FIGS. 3-5, more detailed views of U-shaped clevis bracket 102, second clevis plate 122, and first clevis plate 120 are shown. FIG. 3 illustrates U-shaped clevis bracket 102, which, as described above, comprises an opening or slot 103 sized to fit the distal end of a shift lever therein, with the shift lever being coupled to the U-shaped clevis bracket 102 via a screw, pin, or other appropriate fastener through holes 104. A pivot hole is formed through U-shaped clevis bracket 102, thereby enabling the clevis assembly 101 to be pivotally coupled to the gear shift assembly. Additionally, connector holes 127a, 127b, 127c, and 127d are formed in respective sides of U-shaped clevis bracket 102 to enable connectors such as rivets, screws, etc., to pass therethrough. U-shaped clevis bracket 102 is preferably formed of a sheet metal, which is a high-strength material but is easily shaped by rolling or bending. In addition, sheet metal can be post-processed (e.g., heat treated) to increase strength of the material. However, other suitable materials, such as high-strength polymers, may also be used. It is also possible for bracket 102 to be formed in a shape other than a U-shape. For example, bracket 102 may be cylindrical. Moreover, the one or more clevis plates may be attached to any appropriate surface of bracket 102 and are not limited to attachment within the U-shaped bracket 102 as shown in FIG. 2.

FIGS. 4-5 show additional details of second clevis plate 122 and first clevis plate 120, respectively, in accordance with an aspect of the invention. Second clevis plate 122 shown in FIG. 4 again comprises a plurality of contact surfaces, for example surfaces 123 and 125. As these surfaces repeatedly contact detents and other components of the gear shift assembly, wear strength and shear strength are paramount. Thus, second clevis plate 122 is preferably made of a sheet metal or other similarly high-strength material, and second clevis plate 122 may be subject to post-processing, such as heat treatment, to further increase strength. However, second clevis plate 122 may alternatively be formed of a different material, such as a high-strength polymer, depending upon the strength requirements of the particular application. Second clevis plate 122 is also shown to have a pivot hole 130 configured to allow a pivot pin for the entire clevis assembly 101 to pass therethough, as well as respective connector holes 128a, 128b to enable a fastener such as a rivet or screw to pass therethrough. Once again, the number, shape, and size of the contact surfaces of second clevis plate 122 may easily be altered based upon the given application or type of gear shift assembly. Second clevis plate 122 may be stamped, machined, or molded to create a component having both high strength and precise tolerances.

FIG. 5 illustrates more details of first clevis plate 120. As with second clevis plate 122 described above, first clevis plate 120 comprises a plurality of contact surfaces, for example surfaces 124, 132 and 123. As these surfaces repeatedly contact detents and other components of the gear shift assembly, their wear strength and shear strength are important to the longevity and effectiveness of the entire gear shift assembly. And, like second clevis plate 122, first clevis plate 120 is preferably made of a sheet metal or other similarly high-strength material and may be subject to post-processing, such as heat treatment, to further increase strength. However, first clevis plate 120 may be made of an alternative material, such as a high-strength polymer. First clevis plate 120 is also shown to have a pivot hole 135 configured to allow a pivot pin for the entire clevis assembly 101 to pass therethough, as well as respective connector holes 134a, 134b to enable a fastener such as a rivet or screw to pass therethrough. Again, the number, shape, and size of the contact surfaces of first clevis plate 120 may easily be altered based upon the given application or type of gear shift assembly. First clevis plate 120 may be stamped, machined, or molded to create a component having both high strength and precise tolerances.

While preferably made of sheet metal, first clevis plate 120 and second clevis plate 122 could be made of different materials, or they could be made of the same material but subjected to different post-processing steps depending upon the strength requirements and applications. In the same way, U-shaped bracket 102 could also be made of a different material than one or both of first clevis plate 120 and second plate 122, or post-processed via a different method. In this way, the manufacturing and assembly process of the overall clevis assembly 101 may be optimized, but at the same time simplified and cost-reduced as compared to a unitary clevis assembly formed via a casting process.

Figure 6:
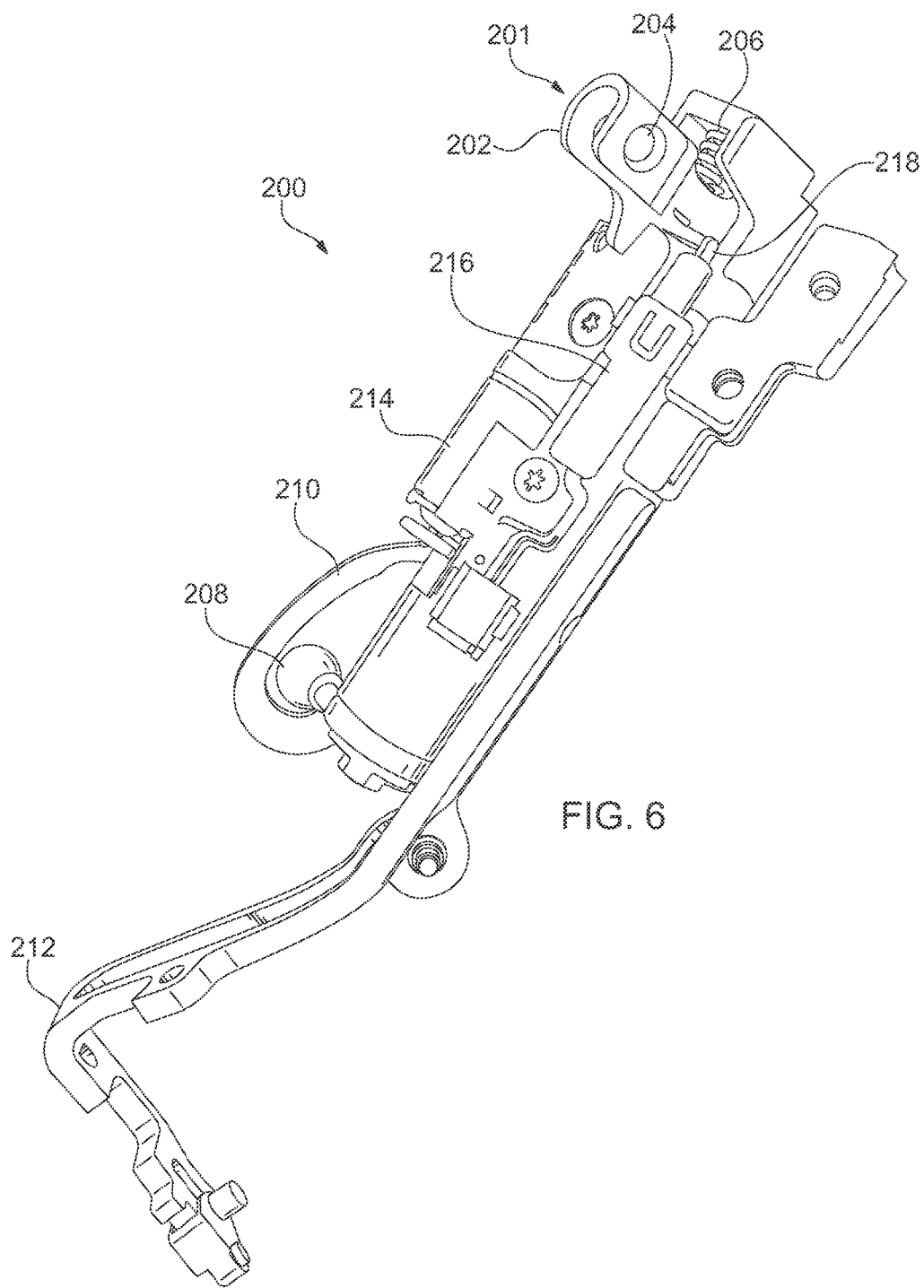
FIG. 6 is a perspective view of another aspect of a gear shift assembly according to the principles of the present invention.

Next, referring to FIG. 6, a gear shift assembly 200 in accordance with an alternative aspect of the invention is shown. Gear shift assembly 200 includes a clevis assembly 201 comprising a U-shaped clevis bracket 202. The details of clevis assembly 201 will be discussed further hereinbelow. A shift lever (not shown) configured as the user interface for gear shift assembly 200 is coupled to U-shaped clevis bracket 202 via an appropriate coupler (e.g., a screw, pin, etc.) at a hole 204. As the user pushes or pulls the shift lever, clevis assembly 201 pivots about an axis such that a ball joint 208 rotates within a slot of a cable arm 210. Cable arm 210, when moved in a first or second direction, is configured to correspondingly move a transmission cable (not shown) to change gears, etc. The transmission cable is guided within a transmission cable bracket 212 of the gear shift assembly 200. A compression spring 206 acts to bias the clevis assembly 201 in a first direction.

Though not readily apparent in FIG. 6, contact surfaces of clevis assembly 201 interact with a BTSI device 214 and a PDS device 216 (with associated pin 218) in a manner similar to that described above with respect to FIG. 1.

Figure 7:
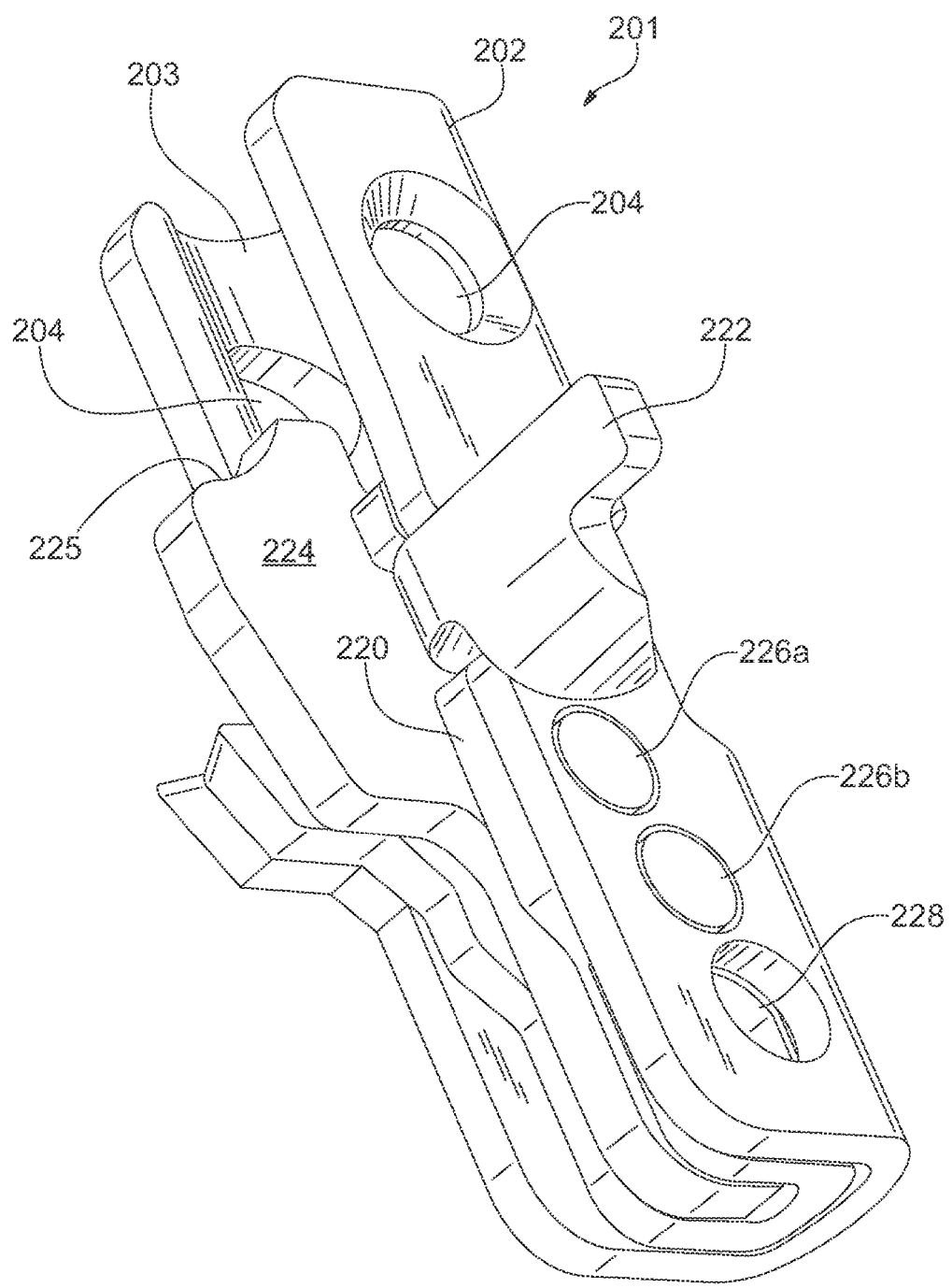
FIG. 7 is a perspective view of another aspect of a multi-piece clevis according to the principles of the present invention.

Referring now to FIG. 7, a detailed view of clevis assembly 201 is shown. Clevis assembly 201 comprises a U-shaped clevis bracket 202, a U-shaped clevis member 220, and a clevis plate 224. U-shaped clevis bracket 202 comprises a hole 204 formed entirely therethrough to enable attachment, via an appropriate connector, of a shift lever held in an opening or slot 203. Furthermore, U-shaped clevis bracket 202 comprises a pivot hole 228 upon which the clevis assembly 201 pivots within the gear shift assembly 200. Respective U-shaped clevis member 220 and clevis plate 224 are held within U-shaped clevis bracket 202 via rivets 226a, 226b. However, it is to be understood that any appropriate connection method (e.g., fasteners, welding, etc.) may be utilized to couple the respective components of clevis assembly 201.

Figure 8:
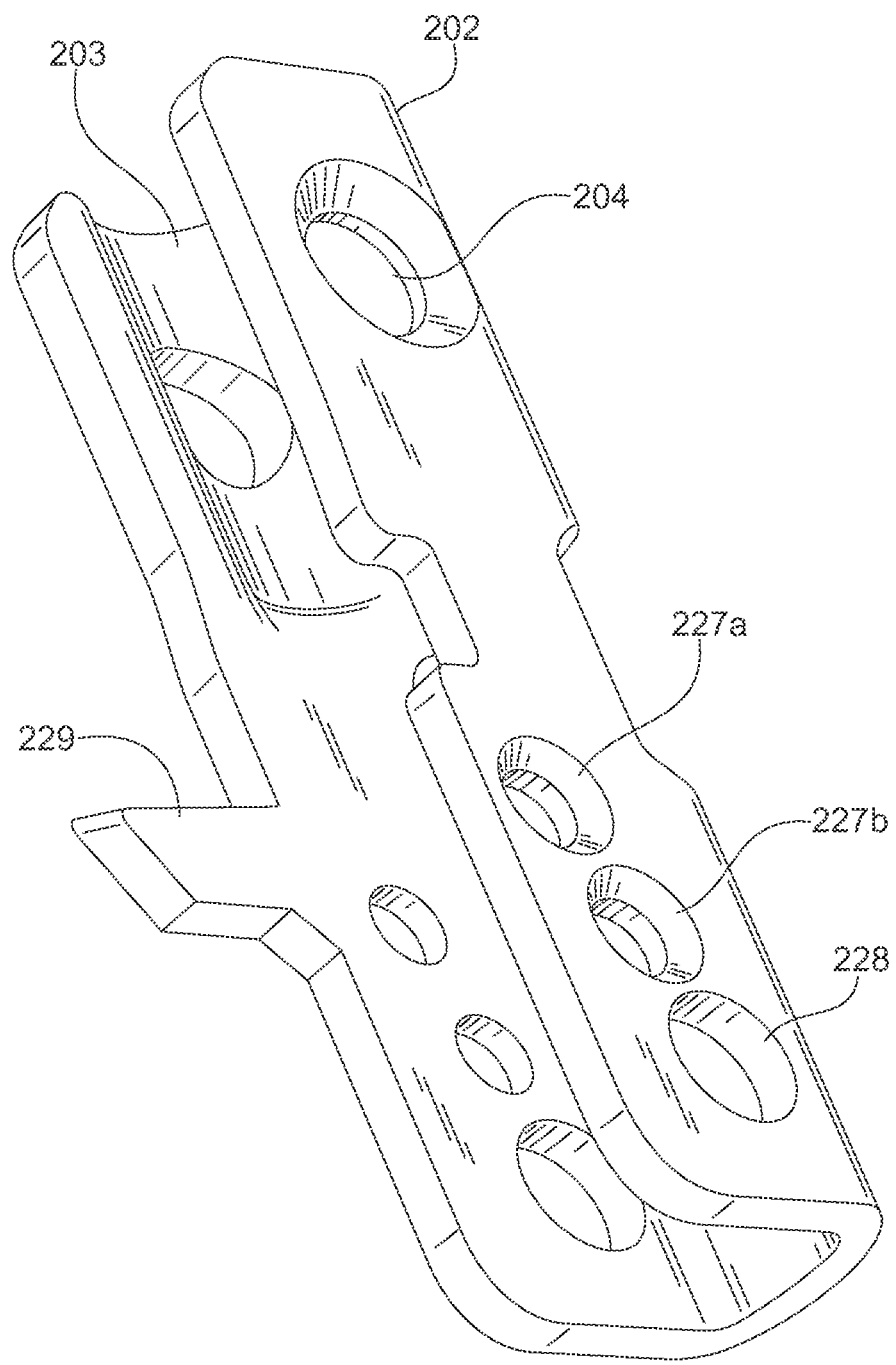
FIG. 8 is a perspective view of another aspect of a clevis bracket according to the principles of the present invention.

As shown in FIG. 8, U-shaped clevis bracket 202 comprises holes 227a, 227b to enable appropriate fasteners to pass therethrough, and U-shaped clevis bracket 202 further comprises a contact tab 229 configured to contact a detent or other components of the gear shift assembly 200 when the clevis assembly 201 is pivoted during operation. U-shaped clevis bracket 202 is preferably formed of a sheet metal, which a high strength material but is easily shaped by rolling or bending. In addition, sheet metal can be post-processed (e.g., heat treated) to increase strength of the material. However, other suitable materials, such as high-strength polymers, may also be used. It is also possible for bracket 202 to be formed in a shape other than a U-shape, such as a cylindrical shape.

FIG. 9 shows U-shaped clevis member 220 in greater detail. U-shaped clevis member 220 is sized and shaped to fit within U-shaped clevis bracket 202, with holes 233a, 233b sized and positioned so as to accept appropriate fasteners therethrough. U-shaped clevis bracket 202 comprises a plurality of contact tabs 222, 234, each with at least one contact surface formed thereon for interaction with detents and other components of the gear shift assembly 200. A hole 232 is formed thereon to allow a pivot pin for the entire clevis assembly 201 to pass therethrough. FIG. 10 shows clevis plate 224, which is sized and shaped to fit within the respective sides of U-shaped clevis member 220. Clevis plate 224 has a plurality of contact surfaces and/or contours, such as contour 225, and has holes 237a, 237b formed therein to enable appropriate fasteners to pass therethrough. A cut-out 235 is shown, which allows a pivot pin for the entire clevis assembly 201 to pass therethrough.

While each are preferably made of sheet metal or a similar material, U-shaped clevis bracket 202, U-shaped clevis member 220, and clevis plate 224 could be made of different materials, or they could be made of the same material but subjected to different post-processing steps depending upon their respective strength requirements and applications. Additionally, more or fewer U-shaped members and/or clevis plates could be used, depending on the type and configuration of the gear shift assembly. Each component could be stamped, machined, or molded separately, and each component could be post-processed separately. In this way, the manufacturing and assembly process of the overall clevis assembly 201 may be optimized, but at the same time simplified and cost-reduced as compared to a unitary clevis assembly formed via a casting process.

The preferred aspects of the invention have been described in detail herein. However, it will be appreciated by those skilled in the art that various modifications and alternatives to the preferred aspects may be made to the invention without departing from the concepts disclosed in the foregoing description. Such modifications are to be considered as included within the following claims unless the claims, by their language, expressly state otherwise. Accordingly, the particular aspects described in detail hereinabove are illustrative only and are not limiting as to the scope of the invention, which is to be given the full breadth of the appended claims and any and all equivalents thereof.

The invention claimed is:

1. A clevis assembly for use in a gear shift assembly of a vehicle, the clevis assembly comprising:
   a clevis bracket having a first end and a second end, the clevis bracket configured to be linked to a gear shift lever at the first end thereof; and
   at least one additional member rigidly coupled to the second end of the clevis bracket between first and second plates of the clevis bracket, wherein the at least one additional member comprises one or more contact surfaces configured to interact with one or more components of the gear shift assembly.

2. The clevis assembly of claim 1, wherein the clevis bracket is a U-shaped bracket.

3. The clevis assembly of claim 1, wherein the at least one additional member comprises a first plate member and a second plate member, the first plate member having a shape different than the second plate member.

4. The clevis assembly of claim 3, wherein the first plate member and the second plate member are affixed to the clevis bracket via welding.

5. The clevis assembly of claim 3, wherein the first plate member and the second plate member are affixed to the clevis bracket via at least one fastener, further wherein the at least one fastener is one of a rivet, a screw, and a pin.

6. The clevis assembly of claim 1, wherein the clevis bracket and the at least one additional member are formed of sheet metal.

7. The clevis assembly of claim 6, wherein at least one of the clevis bracket and the at least one additional member is heat treated.

8. The clevis assembly of claim 1, wherein the clevis bracket and the at least one additional member are formed by one or more of stamping, machining, and molding.

9. A gear shift assembly for a vehicle, the gear shift assembly comprising:
   an armature coupled to a first end of a cable or other linkage, wherein the second end of the cable or other linkage is configured to be coupled to a transmission assembly of the vehicle; and
   a clevis assembly configured to rotate the armature between a first position and a second position, the clevis assembly comprising:
      a clevis bracket having a first end and a second end, the clevis bracket configured to be linked to a gear shift lever at the first end thereof; and
      at least one additional member rigidly coupled to the second end of the clevis bracket between first and second plates of the clevis bracket, wherein the at least one additional member comprises one or more contact surfaces configured to interact with one or more components of the gear shift assembly.

10. The gear shift assembly of claim 9, wherein the gear shift assembly further comprises one or more interlock devices.

11. The gear shift assembly of claim 10, wherein the one or more interlock devices is a brake transmission shift interlock (BTSI) device.

12. The gear shift assembly of claim 10, wherein at least one of the contact surfaces of the at least one additional member is configured to contact a component of the one or more interlock devices.

13. The gear shift assembly of claim 9, wherein the clevis bracket and the at least one additional member are formed of sheet metal.

14. The gear shift assembly of claim 13, wherein at least one of the clevis bracket and the at least one additional member is heat treated.

15. A method of forming a clevis assembly for use in a gear shift assembly of a vehicle, the method comprising the steps of:
   forming a clevis bracket having a first end and a second end;
   forming at least one additional member having one or more contact surfaces thereon; and
   rigidly coupling the at least one additional member to the second end of the clevis bracket between first and second plates of the clevis bracket.

16. The method of forming a clevis assembly of claim 15, wherein the step of coupling the at least one additional member to the second end of the clevis bracket comprises attaching the at least one additional member to the clevis bracket via welding or one or more fasteners.

17. The method of forming the clevis assembly of claim 15, wherein at least one of the clevis bracket and the at least one additional member are formed of sheet metal.

18. The method of forming the clevis assembly of claim 17, wherein the step of forming the clevis bracket comprises bending the sheet metal into a U-shaped bracket.

19. The method of forming the clevis assembly of claim 18, wherein the step of coupling the at least one additional member to the second end of the clevis bracket comprises affixing the at least one additional member within the U-shaped bracket.

* * * * *